(No Model.) 2 Sheets—Sheet 1.
M. G. COOK.
WEIGHING SCALE.

No. 349,570. Patented Sept. 21, 1886.

Witnesses:
John A. Rennie
Fred L. Emery

Inventor,
Moses G. Cook
by Crosby Gregory
Atty's (No Model.) 2 Sheets—Sheet 2.
M. G. COOK.
WEIGHING SCALE.
No. 349,570. Patented Sept. 21, 1886.
Fig: 3
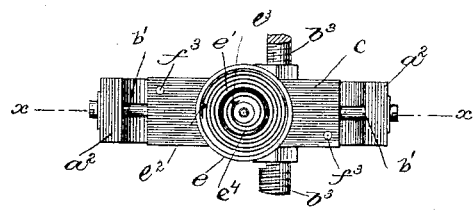
Fig: 4.
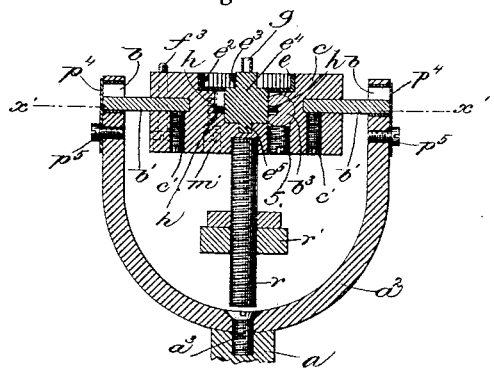
Fig: 5.
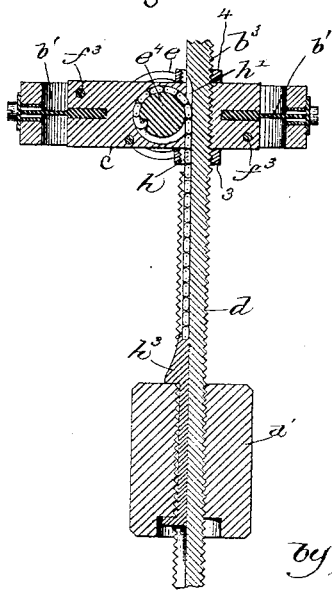
Witnesses:
John A. Kenrick
Fred L. Emery
Inventor,
Moses G. Cook
by Crosby & Gregory
att'ys

UNITED STATES PATENT OFFICE.

MOSES G. COOK, OF ASHFIELD, MASSACHUSETTS.

WEIGHING-SCALE.

SPECIFICATION forming part of Letters Patent No. 349,570, dated September 21, 1886.

Application filed March 29, 1886. Serial No. 196,944. (No model.)

*To all whom it may concern:*

Be it known that I, MOSES G. COOK, of Ashfield, county of Franklin, and State of Massachusetts, have invented an Improvement in Scales, of which the following description, in connection with the accompanying drawings, is a specification, like letters on the drawings representing like parts.

This invention has for its object the production of a scale by which small articles can be quickly and accurately weighed.

My improved scale is especially adapted to be used by druggists and jewelers when it is desired to make a fine and rapid weighing; and it consists, essentially, of the scale-beam having one of its arms threaded and provided with a slot, a threaded sleeve mounted on said arm, a dial, a co-operating pointer, and a support for said pointer, combined with means, independent of the threaded arm and traveling in the slot, to connect said sleeve and support, whereby changes of position of said sleeve with relation to the threaded arm may be indicated on the dial to register variations in weight.

My invention also consists, in combination with the scale-beam, of a lever provided with studs or projections, one above and the other below said beam, and with means, substantially as will be described, to turn said lever on its pivot to remove said studs or projections from contact with said beam, and with means, substantially as will be described, to cause said studs to engage said beam and bring it to rest after each trial balance.

My invention further consists in details of construction, to be pointed out in the claims at the end of this specification.

Figure 1:
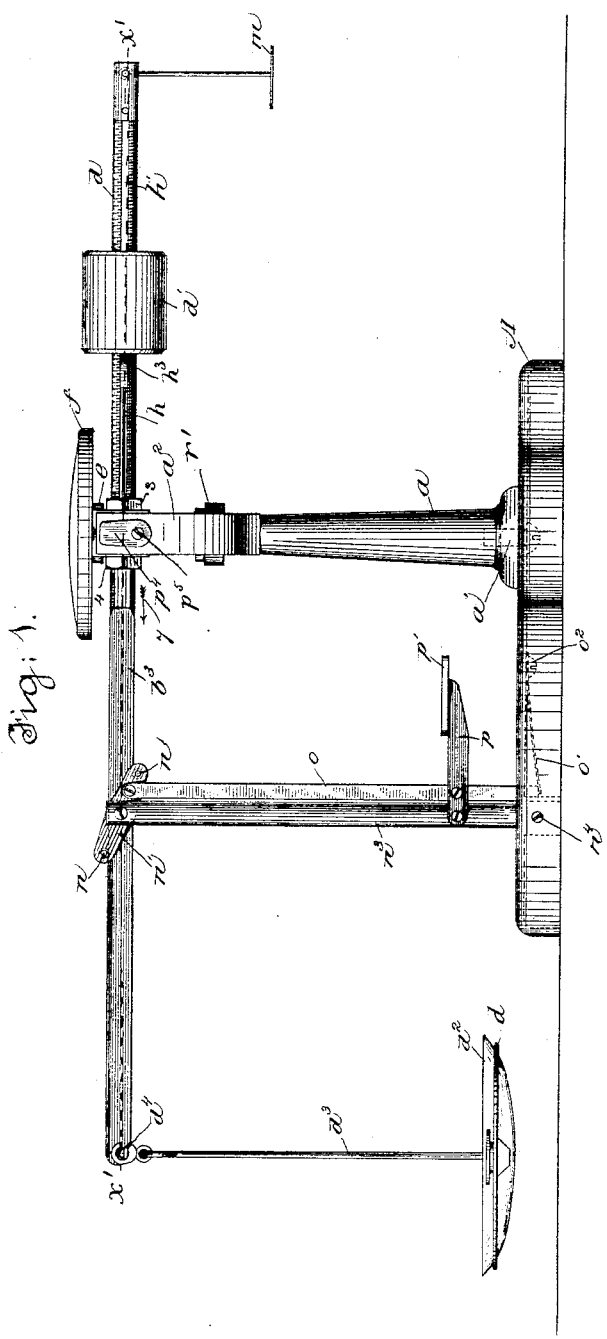
Figure 2:
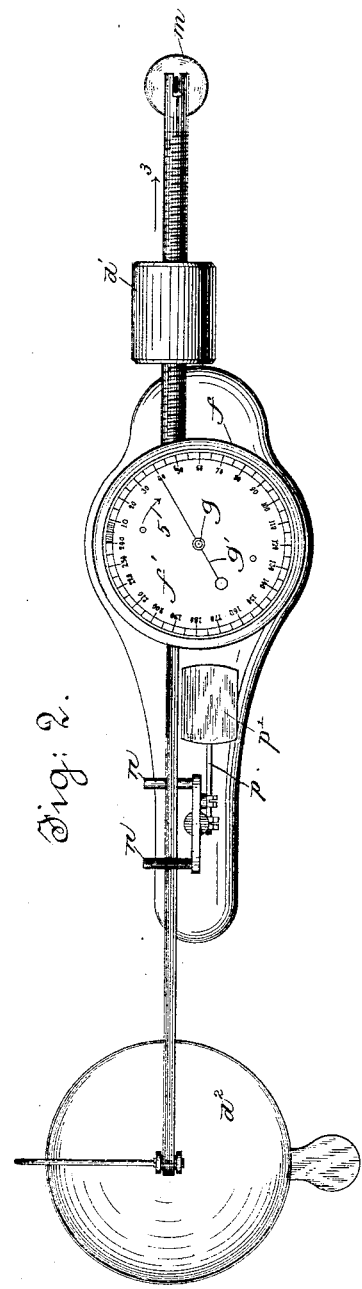

Figure 1 is a side elevation of a scale constructed in accordance with my invention; Fig. 2, a plan view of Fig. 1; Fig. 3, a partial top view of Fig. 1, with the dial-case removed; Fig. 4, a section of Fig. 3 on line $xx$; and Fig. 5, a section on line $x'x'$, Fig. 4, it being made chiefly to show the connection between the sleeve and hub to be described.

The base A, herein shown, has an upright, $a$, secured to it by a screw, $a'$, (shown in dotted lines, Fig. 1,) said upright having a yoke-piece, $a^2$, attached to it by a screw, $a^3$, as shown in Fig. 4. Each arm of the yoke-piece $a^2$ is slotted, as at $b$, to form bearings for the knife-edges $b'$, which constitute the fulcrum for the beam $b^3$.

The knife-edges referred to are herein shown as inserted in slots in a block, $c$, and firmly secured therein by screws $c'$.

The beam $b^3$ is extended through and supported by the block $c$, said beam having one of its arms, as $d$, threaded, to be engaged by threads on the inner surface of a sleeve, $d'$, said sleeve being capable of movement over the threaded arm $d$, and being of sufficient weight to counterbalance the weight of a pan, $d^2$, supported by a frame, $d^3$, suspended from knife-edges $d^4$, secured to the beam $b^3$ at or near its end, as shown in Fig. 1.

The block $c$ is herein shown as recessed, to receive a barrel, $e$, containing a coiled spring, $e'$, one end of said spring being fastened, as at $e^2$, to said barrel, the other end of the spring being secured, as at $e^3$, to a hub, $e^4$, a stud, $e^5$, on said hub being adapted to enter and be rotated in a socket in the block $c$, as shown in Fig. 4.

The block $c$ supports a dial-case, $f$, containing a dial, $f'$, provided with graduations, said dial being herein shown as graduated to grains, there being two hundred and forty grains, or one-half ounce, (indicated by the dial shown in Fig. 2,) the dial-case $f$ being fastened to the block $c$ by screws $f^3$. (Shown in Figs. 3, 4, and 5.) The stud $g$ on the hub $e^4$ is extended through the dial-case $f$ and dial $f'$, and has mounted upon it a pointer, $g'$. (See Fig. 2.) The hub $e^4$ has wound around it a chain, $h$, which is fastened at one end to said hub, and has its other end attached to a slide-bar, $h^3$, cut away so as to fit the sleeve $d'$, as shown in Fig. 5, said chain and bar $h^3$ being adapted to move longitudinally in a slot, $h'$, (see Fig. 1,) in the arm $d$ of the beam $b^3$ when the sleeve $d'$ is rotated. The sleeve $d'$ will normally be in such position on the arm $d$ that the pointer $g'$ will be at zero on the dial.

When it is desired to ascertain the weight of any article or substance, the said article or substance is placed in the pan $d^2$, and the sleeve $d'$ is then rotated in the direction of the arrow 3, Fig. 2, until an equipoise has been obtained. As the sleeve $d'$ is rotated in the direction of the arrow 3, the hub $e^4$, the stud $g$, and pointer $g'$, attached to said stud, are rotated, the pointer $g'$ moving in the direction of the arrow 5 in Fig. 2, the movement of the sleeve $d'$ being communicated to the hub $e^4$ through the chain $h$ and bar $h^3$. After each weighing the sleeve $d'$ may be rotated and moved in a direction reverse to that indicated by arrow 3, and when so rotated the spring $e'$ will rotate the hub $e^4$ in the direction opposite to that indicated by arrow 5, the rotation of the sleeve $d'$ being maintained until the pointer $g'$ has been restored to zero.

The dial herein shown is graduated to indicate two hundred and forty grains, or one-half ounce; but when it is desired to weigh quantities larger than one-half ounce additional weights may be placed on a pan, $m$, suspended from the end of the arm $d$, as shown in Fig. 1.

The tension of the spring $e'$ can be regulated by unscrewing from the barrel $e$ the screw $m'$, (shown in Fig. 4,) and then rotating the said barrel until the spring has attained the required tension, the screw $m'$ being again screwed into the said barrel to maintain the spring at said tension.

When it is desired to weigh rapidly, the beam $b^3$ is quickly brought to rest after each trial balance by means of studs or projections $n$, secured one at each end to a lever, $n'$, (see Figs. 1 and 2,) said lever being pivoted to a standard, $n^3$, secured to the base A by screw $n^4$, said studs being one above and the other below the beam $b^3$.

The lever $n'$ has pivoted to it a link, $o$, extended through the top of the base A, the end of said link being herein shown as resting upon a flat spring, $o'$, secured to the under side of the top of said base by screw $o^2$. (Shown in dotted lines, Fig. 1.)

After the article or substance has been placed in the pan $d^2$ the operator depresses a lever, $p$, provided with a finger-plate, $p'$, said lever being pivoted to the link $o$ and to the standard $n^3$, the depression of the lever $p$ turning the lever $n'$ on its pivot, and removing the studs $n$ from contact with the beam $b^3$, to permit said beam to turn on its fulcrum. If a balance has not been obtained, the operator lifts his finger from the plate $p'$, whereupon the spring $o'$ acts to raise the link $o$ to turn the lever $n'$ on its pivot, to thereby bring the studs $n$ into contact with the beam $b^3$, thus bringing said beam to rest. The slots $b$ in the yoke-piece $a^2$ are closed by covers $p^4$, herein shown as secured to the outside of said yoke-piece by screws $p^5$, and adapted to be turned on said screws as a pivot to uncover said slots, to thereby permit the beam $b^3$ and block $c$ to be removed for repairs or for the substitution of new parts, when required.

The lower side of the block $c$ has secured to it a screw-rod, $r$, provided with a nut, $r'$, adapted to be rotated on said rod, to thereby adjust the position of the center of gravity of the balance or scale with relation to the fulcrum, whereby greater or less sensitiveness may be obtained.

The beam $b^3$, near its center, has a portion of its circumference cut away or made flat, as shown in Fig. 4. The cut-away portion of the beam $b^3$ is longer than the width of the block $c$, so that a part of the cut-away portion extends beyond said block, as shown in Fig. 1, to permit the beam to be adjusted longitudinally. Upon the beam $b^3$, at opposite sides of the block $c$, are nuts 3 4, by which the position of the beam may be adjusted longitudinally.

The beam $b^3$ is herein shown as maintained in its adjusted position by means of the screw 5, (see Fig. 4,) which bears against the lower part of said beam. When it is desired to adjust the beam—as, for instance, to lengthen the arm $d$ and shorten the arm on the opposite side of the block $c$—the screw 5 will be loosened and the nut 4 will be rotated to move it away from the block $c$ in the direction of arrow 7, Fig. 1, and then the nut 3 will be turned, so as to move the beam $b^3$ toward the right in Fig. 1, until the required adjustment has been reached.

It is evident the screws 5 might be dispensed with and the nuts 3 and 4 used to adjust the beam.

I claim—

1. In a scale, the beam having one of its arms threaded and provided with a slot, a threaded sleeve mounted on said arm, a dial, a co-operating pointer, and a support for said pointer, combined with means, substantially as described, independent of the threaded arm and traveling in the slot, to connect said sleeve and support, whereby changes of position of said sleeve with relation to the threaded arm may be indicated on said dial, as and for the purpose set forth.

2. In a scale, the beam having one of its arms threaded and provided with a slot, and a threaded sleeve mounted on said arm, combined with a dial, a co-operating pointer, a support for said pointer, and with the chain $h$ and bar $h^3$, connecting said support and sleeve and traveling in said slot, as and for the purpose set forth.

3. The threaded arm $d$, provided with a slot, a threaded sleeve mounted on said arm, the chain $h$, and bar $h^3$, movable in said slot, combined with a hub connected to said chain and adapted to be rotated to move a pointer over a dial when the sleeve is moved in one direction, and with means, substantially as described, to rotate said hub and move the pointer over the dial in a contrary direction when the sleeve is moved in an opposite direction, substantially as described.

4. The base A, the upright $n^3$, and the lever $n'$, pivoted to said upright and provided with studs $n$, located above and below the scale-beam, combined with the scale-beam, and with means, substantially as described, to turn said lever on its pivot to remove said studs from contact with the said beam, and with means, substantially as described, to cause the said studs to engage said beam and bring it to rest, substantially as and for the purpose specified.

5. The base A, the upright $n^3$, and the lever $n'$, pivoted to said upright and provided with studs or projections $n$, located above and below the scale-beam, combined with the scale-beam and with the link o, the lever p, provided with the finger-plate p', by depressing which said studs are removed from contact with the scale-beam and said beam permitted to oscillate, and with the spring o', acting on the link o, to turn the lever n' on its pivot, to cause the studs to engage with the scale-beam to bring the same to a state of rest when the pressure is removed from the plate p', substantially as described.

6. In a scale, the beam provided with the threaded arm d, having a portion of its circumference cut away or made flat, and a block to support the said beam, and through which it is extended, combined with nuts 3 4, to adjust the length of the arms of the said beam, substantially as described.

7. In a scale, the beam having one of its arms threaded and provided with a slot, a threaded sleeve mounted on said arm, a dial, a co-operating pointer therefor, and a support for said pointer, combined with means, substantially as described, independent of the threaded sleeve and traveling in the slot, to connect said sleeve and support and rotate the latter, and move the pointer over the dial when the sleeve is moved in one direction, and with means, substantially as described, to rotate said support in an opposite direction when the sleeve is moved in a contrary direction, substantially as specified.

In testimony whereof I have signed my name to this specification in the presence of two subscribing witnesses.

MOSES G. COOK.

Witnesses:
B. J. NOYES,
C. M. CONE.